United States Patent [19]

Heuser et al.

[11] 3,726,830
[45] Apr. 10, 1973

[54] STABILIZATION OF POLYESTERS

[75] Inventors: Günther Heuser, Troisdorf-Oberlar; Norbert Vollkommer, Troisdorf, both of Germany

[73] Assignee: Dynamit Nobel Aktiengesellschaft, Troisdorf, Germany

[22] Filed: July 14, 1971

[21] Appl. No.: 162,475

[30] Foreign Application Priority Data

July 24, 1970 Germany..................P 20 36 712.8

[52] U.S. Cl......260/45.8 A, 260/45.7 P, 260/45.9 R, 260/45.95 H
[51] Int. Cl. ...........................................C08g 51/60
[58] Field of Search.....................260/45.95, 45.8 N, 260/45.9

[56] References Cited

UNITED STATES PATENTS

| | | | |
|---|---|---|---|
| 3,491,057 | 1/1970 | Kato et al. | 260/45.8 |
| 3,196,185 | 7/1965 | Ranson | 260/45.95 |
| 3,285,855 | 11/1966 | Dexter et al. | 260/45.85 |
| 3,400,099 | 9/1968 | Cook | 260/45.9 |
| 3,510,449 | 5/1970 | Negato et al. | 260/45.7 |

Primary Examiner—Donald E. Czaja
Assistant Examiner—V. Hoke
Attorney—Ralph D. Dinklage et al.

[57] ABSTRACT

Polyesters, especially beta-lactone based polyesters such as polypivalolactone, are stabilized against thermo-oxidative decomposition by admixing therewith phthalimide alone or in combination with N-acyl-p-aminophenol as an antioxidant.

5 Claims, No Drawings

STABILIZATION OF POLYESTERS

BACKGROUND

The invention relates to the stabilization of polyesters against thermo-oxidative decomposition during the fabricating process and against the effects of light and the atmosphere.

A number of polyesters have high melting temperatures. These include polypivololactone and other polyesters which are obtained by the ring-opening polymerization of β-lactones on the basis of α, α-dialkyl-β-propiolactones, as well as polyarylesters and others.

Polypivololactone is characterized by high crystallinity and great hardness. Consequently, this polyester is of special interest as a fiber material and as a thermoplastic. The melting temperature is between 230° and 240° C. Since fabrication is performed as a rule at a temperature above the melting temperature, fabrication temperatures between 250° and 300° C are necessary.

It is known that, at these fabrication temperatures, the action of air results in a great loss of the molecular weight combined with an impairment of mechanical properties. At 270° C, the molecular weight of polypivololactone drops within 10 minutes from about 150,000 to about 30,000, and on down to 20,000 within another 30 minutes.

The decomposition of polyesters can be retarded by the addition of stabilizers. As a rule, combinations of a stabilizer and an anti-oxidant are used, resulting in a synergetic enhancement of their effectiveness. French Patent 1,523,848 and British Patents 1,055,740 and 1,120,920 describe such combinations. The stabilizers used are compounds of varying structure, such as nitroso compounds, e.g. nitrosamines and nitrosophenols, and arylguanidines, and also thio compounds, e.g., derivatives and salts of dithiocarbamic acid. The antioxidants are phosphites, especially tri-(nonylphenyl)-phosphite, amines, especially N-phenyl-β-naphthylamine, and phenols, especially sterically impeded phenols with bulky substituents in the ortho position, such as 2,6-di-tert. butylphenol. However, when these compounds are used in the stated range of concentrations, important disadvantages are encountered.

As a result of the high fabricating temperature, the action of air produces intense discoloration ranging from intense yellow to dark brown, depending on the stabilizer or antioxidant used. The sulfur compounds, particularly, result in a brown discoloration. In regard to fabrication into shaped bodies and fibers and the dyeing thereof discoloration is an undesirable factor making the achievement of light shades of color virtually impossible. Furthermore, if the sulfur compounds are used an unpleasant odor is involved which is troublesome when it comes to technical fabrication. When aromatic amines are used there is also an after-darkening of the polyester mass under the effect of light and the atmosphere.

SUMMARY

The subject of the invention is the use of phthalimide for the stabilization of polyesters, alone or in combination with an N-acyl-p-aminophenol as antioxidant, each in quantities of 0.001 to 1 wt. percent, preferably 0.01 to 0.1 wt percent, with respect to the polyesters.

An enhanced synergetic action is achieved by the addition of the antioxidant.

DESCRIPTION

The N-acyl-p-aminophenols (amidophenols) used as antioxidants are described by the general formula

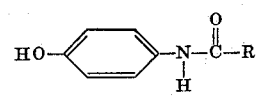

wherein R represents an aliphatic or aromatic, branched or unbranched hydrocarbon radical. Preferred antioxidants are for example, n-butyryl-p-aminophenol, n-pelargonyl-p-amino-phenol, n-lauroyl-p-aminophenol, n-stearyl-p-aminophenol.

The stabilizing effect of phthalimide alone or in combination with N-acyl-p-aminophenols, is achieved with polyesters regardless of the nature and manufacture of the polyesters. For example, polyesters which have been made from dicarboxylic acids such as terephthalic acid and bivalent alcohols such as ethylene glycol, 1,3-butylene glycol, 1,2-propylene glycol, neopentyl glycol, etc., are stabilized, as are the so-called polyaryl esters.

Likewise, if necessary, those polyesters can be stabilized which have been made by the polymerization of lactones and other compounds forming polyesters by ring cleavage, such as β-propiolactone, δ-valerolactone, and ε-caprolactone, especially those made by the polymerization of the corresponding alkyl-substituted lactones.

Also, unsaturated polyester resins prepared from polybasic unsaturated or saturated carboxylic acids such as maleic acid, fumaric acid, succinic acid, sebacic acid or phthalic acid, or their anhydrides, and unsaturated monovalent or saturated bivalent alcohols such as alkyl alcohol, or the above-named glycols, and sometimes other unsaturated compounds such as styrene, cyclopentadiene or dialkylphthalate, can be stabilized, and so can the so-called polyester-urethane elastomers, if necessary.

Stabilization in accordance with the invention is especially valuable for high-melting polyesters, such as those of the polylactone group, as for example the poly-α,α-dialkyl-β-propiolactones and their copolymers and mixtures, especially polypivalolactone, and those of the polyaryl ester group, since hitherto their stabilization has been inadequate for the high fabricating temperatures that are required.

The advantage of stabilization in accordance with the invention over other known stabilizers lies in the greater synergetic effect of the described stabilizer combination, which is reflected by the weight ratio of stabilizer to antioxidant, of 1 : 0.5 as compared with 1 : 4 and 1 : 2 (see Table). The quantity of the antioxidant can thus be reduced to about one-tenth of what must be used according to the best state of the art.

Discoloration of the polyester compounds both during fabrication and under the influence of light and the atmosphere is completely prevented. Furthermore, there is no foul odor involved in fabrication.

The addition of the stabilizer combination can be performed by mixing the components together in powder form or by wetting the polyester powder with a solution of the stabilizer combination in a solvent in which the polyester itself does not dissolve, and then removing the solvent by evaporation. The fabrication of the polyester is performed as a rule from the molten state.

Polypivalolactone was used in testing the effectiveness of the stabilizer combination, because, due to its high fabricating temperature, the stabilizer must satisfy the most exacting requirements. The stabilized polyester was kept in the fused state at 270° C under air, while the loss of molecular weight was tested with a viscosimeter. The measurements were performed at 20° C in trifluoro-acetic acid at a concentration of 0.5 g/100 ml. The "inherent viscosity" was determined,

EXAMPLE 5

Poly-$\alpha,\alpha$-diethyl-$\beta$-propiolactone in powder form, with an inherent viscosity of 2.9, is stabilized with 0.06- wt percent of phthalimide and 0.03 wt percent of $\eta$-lauroyl-p-aminophenol and the polyester is kept in the melted state in an open vessel at 260° C for 10 minutes and 40 minutes. Within these periods of time the viscosity diminished to 2.65 and 2.2, respectively.

A specimen of poly-$\alpha,\alpha$-diethyl-$\beta$-propiolactone of the same viscosity of 2.9 was degraded, under the same conditions as Example 5, but without stabilizer, to an inherent viscosity of 1.4 and 1.12, respectively.

| | | | Weight percent | | Molecular weight | | |
|---|---|---|---|---|---|---|---|
| | Stabilizer | Antioxidant | Stab. | Antiox. | 10 min., 270° C. | 40 min., 270° C. | Color after 40 minutes at 270° C. |
| Example: | | | | | | | |
| 1 | | | | | 30,000 | 20,000 | Colorless. |
| 2 | A | | 0.10 | | 115,000 | 80,000 | Do. |
| 3 | A | B | 0.05 | 0.02 | 124,000 | 105,000 | Do. |
| 4 | A | C | 0.05 | 0.02 | 124,000 | 104,000 | Do. |
| Examples (for purposes of comparison): | | | | | | | |
| 1 | D | | 0.10 | | 116,000 | 78,000 | Light brown. |
| 2 | D | E | 0.05 | 0.20 | 118,000 | 104,000 | Light brown; dark brown after-discoloration. |
| 3 | F | G | 0.05 | 0.10 | 90,000 | 62,000 | Orange-yellow. |

Example 1: Polypivalolactone with no additive. Initial molecular weight 148,000.
Stabilizers and Antioxidants: A=Phthalimide; B=n-stearyl-p-aminophenol; C=n-pelargonyl-p-aminophenol; D=tetramethylthiuramidisulfide, E=N-phenyl-$\beta$-napthylamine; F=1-nitroso-2-naphth ol; G=tris-(nonylphenyl)-phosphite.

and from this the molecular weights were computed according to the equation: $\eta$ inch. $= 3.10^{-4} \cdot M^{0.8}$.

In the case of poly-$\alpha,\alpha$-diethyl-$\beta$-propiolactone, only the "inherent viscosity" is given, for lack of a molecular weight equation.

EXAMPLES 1 to 4

1.5 g of polypivalolactone in powder form (grain size 0.1 to 0.5 mm), with a molecular weight of 148,000, is wetted with the solution of the stabilizer combination in acetone, the solvent is evaporated, and the specimen is dried in vacuo over phosphorus pentoxide. Then the stabilized polyester is kept in the open reaction glass in a metal bath at 270° C, and the loss of the molecular weight after cooling of the specimen is determined after 10 and after 40 minutes. The results of the stabilization process of the invention are summarized in the following table and compared with effective stabilizer combinations from the literature (Examples 1 to 3).

What is claimed is:

1. A polyester composition stabilized against thermo-oxidative decomposition comprising said polyester and as the stabilizer, phthalimide and an N-acyl-p-aminophenol of the general formula

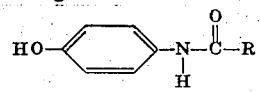

is used, in which R represents an aliphatic or aromatic, branched or unbranched hydrocarbon radical, each present in an amount from 0.001 to 1 percent by weight based on the polyester.

2. Composition of claim 1 wherein the polyester is a polymer based on $\alpha,\alpha$-dialkyl-$\beta$-propiolactones or their copolymers.

3. Composition of claim 1 wherein the polyester is poly-$\alpha,\alpha$-dimethyl-$\beta$-propiolactone.

4. A composition according to claim 1 wherein said N-acyl-p-aminophenol is N-stearyl-p-aminophenol.

5. A composition according to claim 1 wherein said N-acyl-p-aminophenol is N-pelargonyl-p-aminophenol.

* * * * *